United States Patent [19]

Martinez

[11] Patent Number: 4,517,562
[45] Date of Patent: May 14, 1985

[54] FM COMMUNICATION SYSTEM

[75] Inventor: Louis Martinez, Carson, Calif.

[73] Assignee: McGraw-Edison Company, Rolling Meadows, Ill.

[21] Appl. No.: 362,888

[22] Filed: Mar. 29, 1982

Related U.S. Application Data

[63] Continuation-in-part of Ser. No. 87,543, Oct. 23, 1979, Pat. No. 4,322,842, and a continuation-in-part of Ser. No. 250,779, Apr. 3, 1981, Pat. No. 4,415,771.

[51] Int. Cl.³ .................... H04Q 9/00; H04B 1/00; H04J 6/00
[52] U.S. Cl. ............... 340/825.07; 455/353; 455/45; 370/11
[58] Field of Search .......... 370/11; 340/825.07, 340/825.52, 825.08; 455/49, 51, 53, 56, 57, 2, 45, 228, 353; 179/5 R

[56] References Cited

U.S. PATENT DOCUMENTS

| | | | |
|---|---|---|---|
| 2,465,976 | 3/1949 | Goldsmith | 340/825.08 |
| 3,716,654 | 2/1973 | Hendrickson et al. | 455/2 |
| 3,980,954 | 9/1976 | Whyte | 455/45 |
| 4,127,852 | 11/1978 | Preston | 455/228 |
| 4,322,842 | 3/1982 | Martinez | 370/11 |
| 4,415,771 | 11/1983 | Martinez | 179/5 R |

Primary Examiner—Donald J. Yusko
Attorney, Agent, or Firm—Blakely, Sokoloff, Taylor & Zafman

[57] ABSTRACT

Communication system for either public or private electric power load management and distribution automation, and the like, wherein subcarrier signals are sent to a plurality of remotely located receivers and transmitters using an existing standard FM broadcast station. The broadcast signal is detected by a receiver which filters out the subcarrier component of the broadcast signal. The radio frequencies of the plurality of remotely located transmitters and receivers are closely spaced and synthesized from the frequency of the broadcast subcarrier and their time of transmission, digital bit streams, and message frames are all synchronized from the subcarrier signal. The FM broadcast station thereby orchestrates all communication activity to and from the plurality of remote locations to optimize traffic flow and maximize a priori information to all components to significantly increase reliability.

24 Claims, 9 Drawing Figures

RETURN LINK TRANSMITTER

Fig. 8

~ CENTRAL REVERSE LINK RECEIVING SYSTEM ~

FM COMMUNICATION SYSTEM

This invention is a continuation-in-part of my patent application entitled "Broadcast System for Distribution Automation and Remote Metering", U.S. patent application Ser. No. 087,543; filed Oct. 23, 1979, now U.S. Pat. No. 4,322,842, and my patent application entitled "Public Alert and Advisory Systems", U.S. patent application, Ser. No. 250,779; filed April 3, 1981, now U.S. Pat. No. 4,415,771.

BACKGROUND OF THE INVENTION

1. Field of the Invention

This invention relates to a system which provides a reliable communication link from an Electric Utility central control point, or the like, to a large number of customers for such purposes as electric power load management, meter rate setting, and remote meter reading. A synchronized technique using radio methods is disclosed having either one-way or optional two-way capability.

Utilities have expressed need for means to rapidly communicate signals en masse to or from their many customers for such purposes as selectively switching off non-vital appliances, (known as "load management"), for remotely setting meter rates, for remote setting of thermostats, for automatic meter reading, and for automating their power distribution system. The first three purposes require a one-way communication link from the power company to the user, while the second two purposes require bi-directional communiation means. The disclosed system provides both these "forward link" and "return link" roles.

The method herein disclosed employs one or more standard FM radio broadcast stations to transmit control signals to the customers and a low power narrow band transmitter at each customer location synchronized by the FM broadcast signal.

This invention relates to the subject matter of my U.S. Pat. No. 4,117,405, entitled, "Narrow Band Communication System," issued on Sept. 26, 1978.

The system disclosed here represents a significant departure from communication technologies which have heretofore been proposed for these applications. In the forward link the system employs one existing powerful FM broadcast station or several stations simultaneously to provide reliable coverage over more than 50,000 square miles at very low cost. In the reverse link the system uses a synchronous radio communication method which, for example, enables more than 500,000 separate power meter readings to be accomplished every hour, all on one single conventional radio channel.

2. Prior Art

The principal techniques competing to accomplish the communication functions required in load management and distribution automation include telephone, power line carrier communication, ripple control, radio, and various combinations of these.

Telephone methods are inherently attractive because a telephone line is frequently available to the controlled point. Unfortunately, the vast majority of U.S. telephone lines are incorporated in what is referred to as the "switched network" and because of this only a very small percentage of the telephones can be used at any one time. En masse communication is not possible without an enormous and expensive modification of the telephone plant. Futhermore, not all controlled points are accessable to existing phone lines and a significant number of new lines would be necessary for complete coverage. Of all competing systems, this is probably the most expensive.

An alternative system called "power line carrier", known for decades, uses the distribution power lines to carry signals and suffers many inherent problems arising from the numerous multiple paths, standing waves, and noise-like signals which can exist between utility and consumer. The greatest advantage of a power line carrier method is that the entire system may be owned and under the control of the power company. In general, the power line distribution system must be compensated and carefully checked a priori to insure reliable communication; this is both time consuming and expensive.

The third system, called ripple control, has been used successfully in many foreign countries as well as in a few applications in the United States. They also operate over power lines but only one-way and are relatively expensive installations because large and powerful signal injection equipment must be installed at each Utility substation. Furthermore, their data rate is necessarily low because these systems operate at very low carrier frequencies and require undesirably narrow signal bandwidth, consequently denying "instantaneous" communications. For example, well known existing systems take 20 seconds or more of communication time to affect a reliable one-way signal transmission.

Radio offers a fourth alternative but formidable problems exist for conventional radio systems which typically occupy a complete radio channel about 10 KHz wide during each transmission. Their companion forward link receivers must cope with relatively high radio noise levels and this, coupled with FCC transmitter power limitations, leaves much to be desired in the way of reliable transmission. Moreover, a private central radio transmitter erected by a power company to send control signals will generally be assigned a high radio frequency (e.g. VHF) and this results in relatively expensive control receivers for each consumer, when compared to the inexpensive receivers used in this invention.

SUMMARY OF THE INVENTION

A transmitter subsystem comprising a message source, phase modulator and inaudible subcarrier oscillator generates a signal (for example at 80 KHz) modulated with a digital message stream to provide a subcarrier carrier signal. This modulated subcarrier signal then frequency modulates the regular FM radio program for simultaneous transmission with the regular FM program. A receiver detects the transmission and filters out the subcarrier signal. The subcarrier signal is then synchronously demodulated and both the message and frequency references derived from the subcarrier are utilized.

In most applications the messages which are communicated between the consumer and utility are relatively short, on the order of 30 to 60 bits. The radio carrier frequency of each of the consumer return-link transmitters (and the centrally located utility companies receiver) are synthesized from the radio signal of the FM broadcast station. This provides very precise control of each consumer transmitter frequency. In addition, the same digital clock synchronization circuits associated with the forward link consumer control receiver are shared by the transmitter of the return-link. This greatly simplifies the problem of digital circuit design and guarantees precision timing of message frames and data bits in each of perhaps one million or more customer return link transmitters.

The use of this communication process permits the utility to transmit from a great many consumers on a single radio channel simultaneously. Meter readings (or other data) from up to 128 different consumer locations are multiplexed and transmitted simultaneously on 128 return-link subchannels, all on a single conventional radio channel at, for example, VHF. For example, the intended data rate of 30 bits per second per consumer coupled with 128 simultaneous transmissions of 30 bits each (e.g. a 10 decimal digit report per consumer) results in an overall system capacity to communicate 500,000 independent consumer meter reports per hour. Furthermore, the essentially independent return-link radio subchannels permit "space division" of customers into geographical cells so that several different Utility companies can efficiently share one return-link radio channel in densely populated areas by using different subchannels.

A new and novel feature of the forward-link is the simultaneous employment of two or more commercial broadcast stations which each radiate identical 80 KHz modulated subcarrier control signals on identical FM radio channels, but in separate geographic areas, which areas may be contiguous. This greatly expands the service area and capitalizes on the fact that the same FM radio channel is frequently assigned to several radio stations which may be as close as 75 miles apart. Control receivers tuned to the same frequency can thus be used in any of these areas to simplify logistic problems and reduce cost.

BRIEF DESCRIPTION OF THE DRAWINGS

FIG. 3 is a block diagram of a digital control receiver that detects the broadcast control signals, demodulates and decodes them, and outputs control signals to electrical appliances, distribution automation apparatus and the like.

FIG. 5 illustrates various applications of the remote digital control reciever including control of multi-register watt-hour meters, thermostat relays switches for cycling air conditioners, and the like.

FIG. 6 is an overall simplified block diagram of a bidirectional communication system employing my invention for load management, distribution automation, remote metering and the like.

DETAILED DESCRIPTION OF THE DRAWINGS

Figure 1:
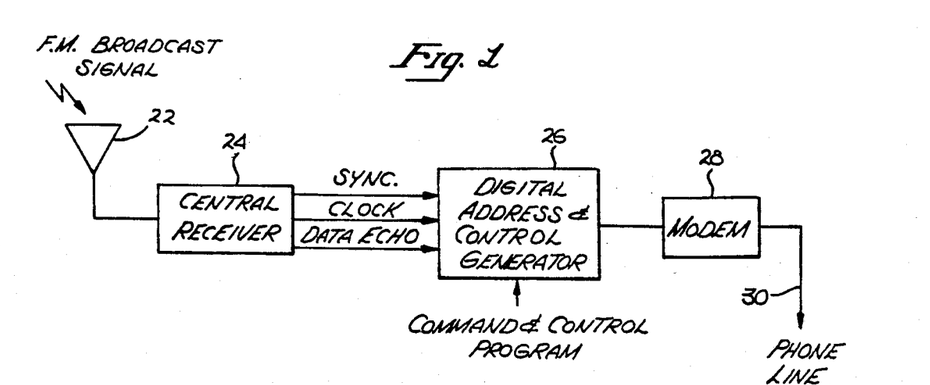
FIG. 1 illustrates the principal components comprising the central controller which may be located at a power company's facilities and is connected to a local broadcast station by phone line or by other means.

FIG. 1 illustrates the circuit arrangement employed at the power company's central controller. A central receiver 24 detects radio signals via antenna 22 and monitors the radio transmissions from the local broadcast station employed in my invention, deriving therefrom timing information for synchronizing its operations. It also detects an "echo" of the data (i.e., address & control signal groups) transmitted by the broadcast station which originated at the central controller. Thus central receiver 24 provides feedback information to varify proper transmission of address & control signals generated by 26. Digital address & control generator 26 employs conventional discrete digital circuits, or it may employ any one of many widely used microprocessors presently on the market.

Generator 26 develops digital addresses corresponding to any one specific remotely located control receiver address code, or it may generate a hierarchy of group addresses, such as the so called "SCRAM" address code which power companies employ when they wish to immediately address all their remotely located control receivers simultaneously. In any event the address portion of the digital address & control signal is generated by 26 in accordance with a prearranged control schedule devised by the power company, or any specific address may be generated at any time desired by using well known "interrupt" techniques. The control portion of the digital address & control signal is the message or command associated with the address portion and this defines specific functions which are to be accomplished by any one specifically addressed remotely located control receiver, or by any combination of such receivers.

Figures 1A, 2:
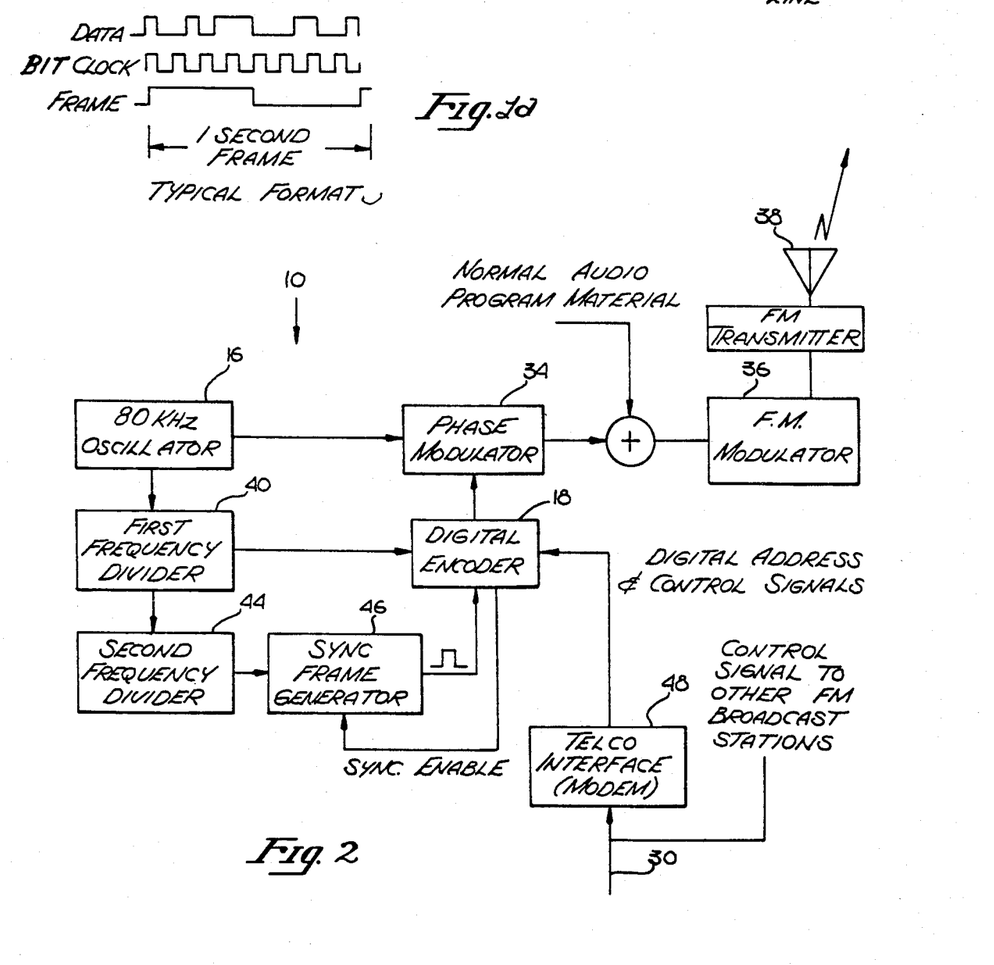
FIG. 1a is a timing diagram illustrating an exemplary relationship between data, the bit clock and the frame clock.
FIG. 2 is a block diagram of the modifications necessary to a broadcast station so that it can receive digital address & control signals from the central controller, and synchronously broadcast the digital control signals on an inaudible subcarrier.

The digital bit streams representing address & control signals are time formatted into specific groups called frames. An illustrative signal format, presented in FIG. 1a, shows a message frame comprising 16 data bits and occupying a time duration of one second. For example, 11 bits could comprise the address and 5 bits could be the control instructions. Of course other time formats with much faster data rates would be equally applicable in my invention. Most important however is the fact that specific time intervals occupied by any given frame, or by any given bit within the frame, is uniquely and very specifically defined and orchestrated by the broadcast station using a synchronizing technique which will be described in following paragraphs. Suffice it to say at this point that these specific time intervals are conveyed to the digital address and control generator 26 by the broadcast station through the central receiver 24; that is, the sync signals defining a message frame, and the clock signal defining digital bit stream intevals.

Thus the signals generated by 26 are time formatted to convey the control requests presented by external control apparatus (such as a power company computer) which contains prestored command sequences developed by the power company and sent to generator 26 via a hard wire connection, for example. The output of generator 26 is connected to a telephone modem for transmission to a local broadcast station; these are conventional communication methods. A microwave link or other methods could also be used to communicate address and control messages from the central controller to the broadcast station.

Control generator 26 also periodically transmits "transmit sync" request signals to the broadcast station through modem 28. These transmit sync request signals might be transmitted once per hour, for example or they may be transmitted more frequently during stormy weather or lightening conditions to insure that all remote receivers are properly in synchronism.

FIG. 2 illustrates the circuit arrangement of the transmitter subsystem 10 at the local broadcast station so it may transmit digital signals using the methods of my invention. Subcarrier oscillator 16 provides a stable signal, for example at 80 KHz. The 80 KHz frequency is selected to be inaudible and remain within the FM radio channel. A first frequency divider 40 divides the frequency of oscillator 16 to a low frequency equal to the digital bit stream clock rate, for example 16 bits per second (BPS). A second frequency divider 44, driven by divider 40, further reduces the frequency of oscillator 16 to the desired message frame rate of one frame per second, in my example. Sync frame generator 46 simply responds to the output of divider 44 to generate a unique code or waveform easily distinguishable from data frames and couples this frame sync signal for transmission at a time requested by the central controller. In this way the frame sync code is transmitted to remotely located control receivers. It will be pointed out later in this specification that frame synchronizing signals need not be transmitted continuously; only at rather widely separated intervals, such as once per hour. This is because all of the remote control receivers derive their basic timing information from an oscillator phase locked to the subcarrier of the broadcast station (i.e., at 80 KHz) and consequently there is zero (or negligible) drift between the master clock time reference of the remote receivers and the master clock reference used by the broadcast station and by the central controller at the power company. Thus all components of my system are locked to the subcarrier frequency of the broadcast station.

Telco interface modem 48 is connected to the central controller modem 28 by a telephone line 30 as previously noted to provide address & control signals to digital encoder 18. The digital address and control signal phase modulates the 80 KHz subcarrier through phase modulator 34 to provide a modulated subcarrier signal. The frequency and bandwidth of the subcarrier signal is selected to be inaudible and does not affect the reception of conventional FM radio receivers. This subcarrier signal then frequency modulates the main broadcast RF carrier of transmitter 37 through FM modulator 36. The resulting modulated RF signal is transmitted by antenna 38 to the receivers, such as the receiver shown in FIG. 3.

Figure 3:
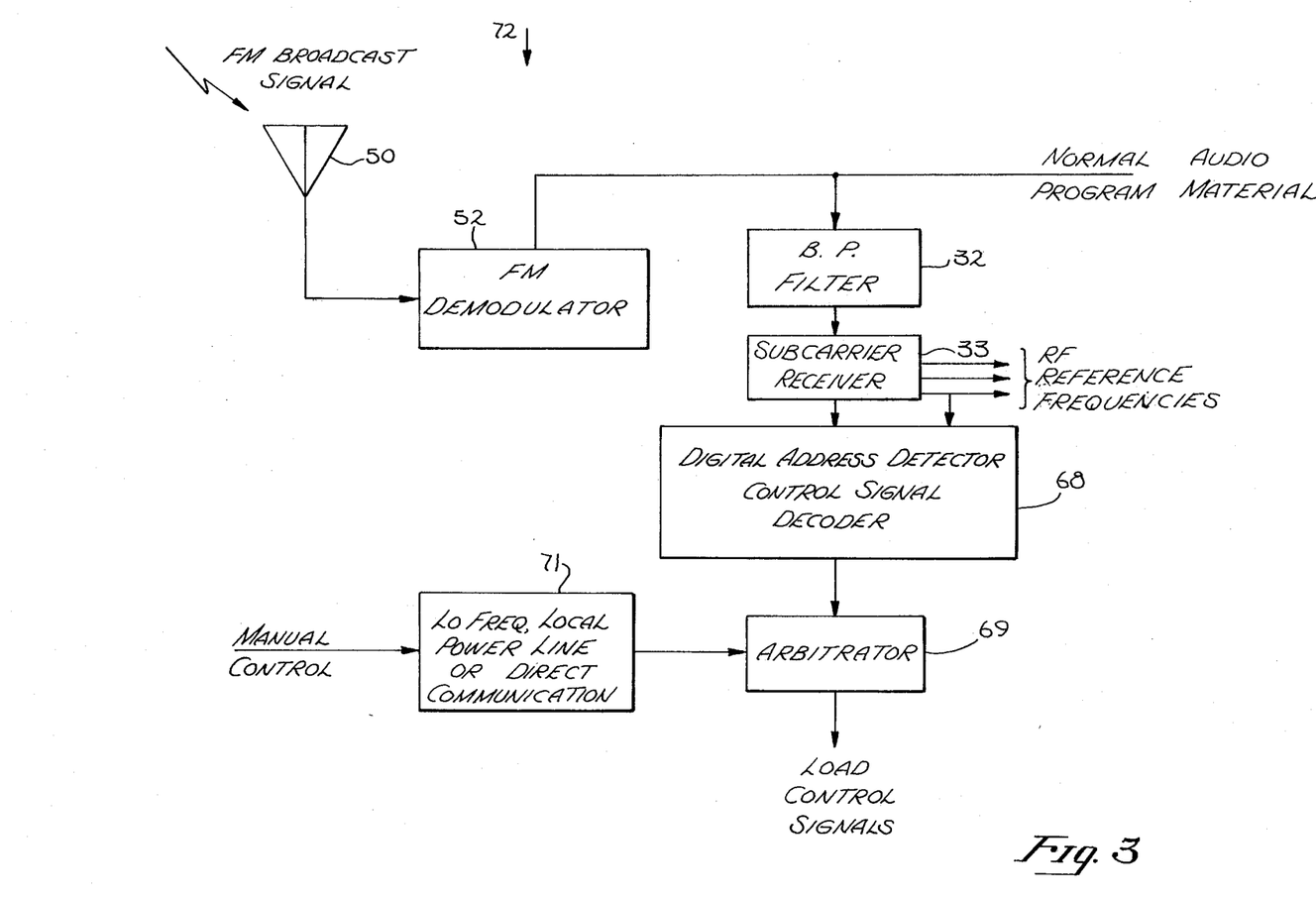

FIG. 3 is a block diagram of a control receiver which may be located remotely at a power company's customer premises to effect control of electric appliances and other devices in the desired manner. It may also be located on the power company's distribution system to effect control of sectionalizing switches, capacitor bank switching, and like functions. Of course it may also be used in other types of systems, such as to control traffic lights, or for remotely controlling roadside signs, and numerous other applications such as described in my patent application Ser. No. 087,543, hereinbefore referred to.

The digital control receiver of FIG. 3 comprises a receiving antenna 50 that receives signals transmitted by broadcast station 4 and couples them to FM receiver-demodulator 52 for frequency demodulation in the conventional manner.

The demodulated signal is then fed through bandpass filter 32 which separates the communication transmission signals (normal audio program material, whether monaural or stereo or other subcarriers) from my phase modulated subcarrier signal. FM receivers receiving the broadcast signals will generally substantially attenuate the phase modulated subcarrier because of its relatively high frequency, and any remaining components will not effect the enjoyment of the normal audio program as the frequency of the subcarrier will be selected to be out of its bandpass, even in FM stereo detectors. The carrier signals can only be received by dedicated receivers which detect and process the subcarrier signals in the manner I herein describe. The subcarrier signal is fed through subcarrier receiver 33 to provide reference frequencies and a base band data signal which is synchronously decoded by digital address & control signal decoder 68. The reference frequencies include a digital clock signal and are used to synchronize and control the return link transmitter.

The control signals are fed through an arbitrator 69, to determine whether the load management control will be manual, i.e. instigated by a local control operator, or automatic, i.e., directed from the radio signal. When a manual control and an automatic control are received simultaneously, the automatic mode will always supercede. When automatic mode is operative, the address portion of the coded signal is compared to a pre-stored address to determine if it is either a unique or a group address for which it must respond. If the signals carry its preset address, then the command portion of the signal is decoded and send out to control any, or all, of a variety of external devices such as electric appliances, watt-hour meters, and the like, depending on the specific control code received. If the control is manual, the operator determines which external device(s) to control, utilizing either a low frequency controller operative over the power lines or direct control of the device. In addition further remote or local control may be conditioned upon or maintained by reading the coded information from an external apparatus such as digital power meter to determine which, if any, of the external devices should be altered for load management. There are many variations of the overall system I have just described that will become obvious to engineers skilled in the art. Nevertheless this arrangement provides a practical working system within the spirit of my invention, though I am aware it may be practiced by other arrangements based on the art taught herein.

Figure 4:
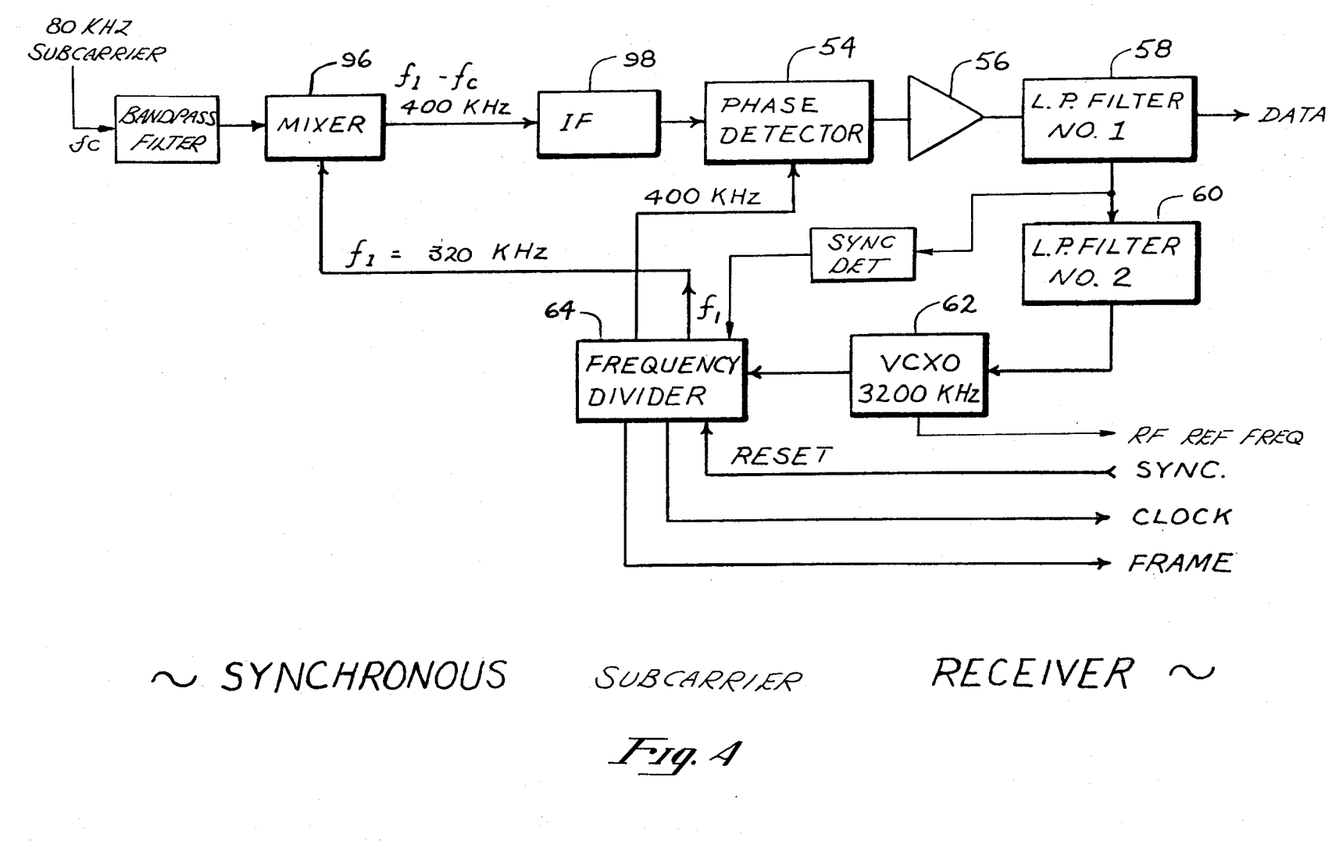
FIG. 4 is a block diagram of a phase lock loop (PLL) subcarrier receiver which detects and demodulates address and control signals and generates reference frequency signals synchronized to the subcarrier transmitted by the FM broadcast station.

FIG. 4 illustrates a synchronous subcarrier receiver. Subcarrier signal $f_c$ is filtered and amplified by amplifier 32 and sent to mixer 96, which mixer also receives a local oscillator frequency $f_l$ from frequency divider 64. The beat frequency comprising intermediate frequency $f_l - f_c$ is sent to intermediate frequency amplifier 98 which has its output connected to phase detector 54. Phase detector 54 also receives a reference signal from frequency divider 64 and outputs a signal proportional to the difference in phase between the two input signals to thereby effect a phase-lock loop operation essentially the same as circuits commonly employed in state-of-the-art receivers. The important point is that a voltage tuned crystal oscillator (VCXO) 62 is, in effect, phase-locked to a fixed multiple of the broadcast station subcarrier frequency. Since both mixer 96 and phase detector 54 receive their reference signals from frequency divider 64 the entire process is fully synchronized. Divider 64 outputs data, a bit stream clock, RF reference frequency and message frame rate information needed to synchronize the companion return-link transmitter, or other apparatus at the receiver site.

To synchronize the receiver circuits in FIG. 4, bit stream clock rates and message frame rates are basically established at the broadcast station by frequency divider means driven by the broadcast station's subcarrier oscillator 16. The VCXO 62 in each remotely located receiver is precisely at the same frequency as the broadcast station carrier frequency, or a multiple of it. The same frequency divider method is used at each remote receiver to regenerate the digital bit stream clock and message frame rate used at the broadcast station. Therefore, these rates are identical to those at the broadcast station. However, the phase of these frames and digital bit stream clocks may not be initially the same as that of the broadcast station. Consequently, the receiver may be out of digital "sync", though in sync at radio frequencies. Sync detector 66 receives the output of low pass filter 58 and detects the special coded synchronizing signals transmitted by the broadcast station and resets frequency synthesizer 64, to synchronize it with the bit stream clock and frame clock of the broadcast station.

Figure 5:
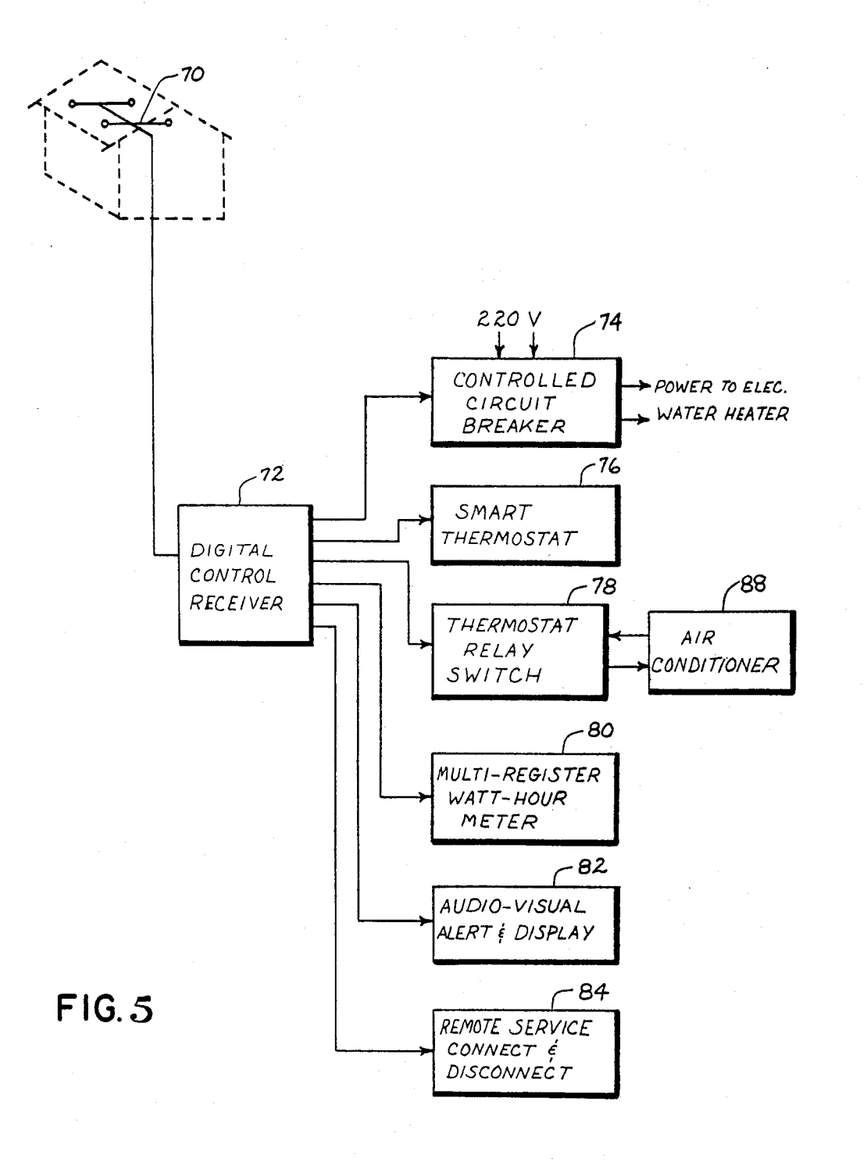

FIG. 5 illustrates several applications using the digital control receiver 72, which receiver comprises the circuit arrangement shown in FIG. 4, or variations of it. One unique improvement illustrated in FIG. 5 is antenna 70 which comprises the electric power wiring existing in a residence. "Antenna" 70 is particularly important in electric power load management applications because other conventional antennas have the disadvantage of tampering susceptibility. There is a possibility a customer wishing to avoid receipt of control signals may try to cover the antenna with metal foil or metal grids. In applications where control receivers are used to switch a multi-register watt-hour meter from one rate to another at different times of day, some customers may try to cover the antenna when the meter is on a low cost rate, and thus avoid paying the higher cost rates mandated by public utility commissions. For example load management systems using radio devices at VHF can suffer this problem. It is not possible to cover antenna 70 of this invention. In one embodiment of the receiver, both the AC power for the receiver and the RF signals are taken from the household power line simultaneously thereby simplifying the installation. Of course a small conventional antenna may be useable in some applications. Both a conventional antenna and the house wiring antenna may be used simultaneously in some installations.

The various applications illustrated in FIG. 5 are evident from the drawing. The controlled circuit breaker 74 comprises a combination of an existing circuit breaker modified to provide for power interruption upon receipt of a signal from the digital contol receiver 72. Control receiver 72 can be made quite small consequently it can be mounted within the envelope of a conventional two pole circuit breaker. The combination is referred to here as a radio controlled circuit breaker. It has the advantage that it can be easily plugged into existing electric circuit breaker panels.

The so-called "smart thermostat" (a trade name of the Honeywell Corporation) is a device which is programmed to provide a selected temperature-time profile in buildings to minimize energy consumption. In many applications it is desirable to have this programmed temperature profile initiated only when heavy power consumption situations exist. By using the combined digital control receiver 72 and a smart thermostat 76 the temperature profile can be initiated by a command from the central controller 2.

Another application involves control receiver 72 driving a small relay switch 78, the combination being put inside an air conditioner 88 so that it interrupts the thermostat circuit to cycle the air conditioner on and off upon receipt of commands from power company central controller 2. The advantage is that relay 78 is relatively small with a capacity of about 1 ampere and it makes use of the expensive higher powered switching device already in the air conditioner which may have a capacity of 40 amperes or more, thus reducing cost and simplifying the installation.

Both federal and state legislation currently in effect require power companies to consider tariff schedules on the basis of time-of-use rates consistent with the cost of generating electrical energy, which costs vary at different times of day, and also seasonally. Electric power meters with two or more accumulating dials are being proposed for this purpose. However it is difficult to control their schedule on a day to day and season to season basis. Digital control receiver 72, in combination with multi-register watt-hour meter 80 provides a solution.

The audio visual display 82, used in combination with digital control receiver 72 provides a means to alert the general population during emergencies.

The ability to remotely connect or disconnect various electric services to customers is a valuable function power companies desire. Digital control receiver 72 in combination with, for example, a latching power relay 84 can provide this service upon request of a customer who may be moving out of or into his residence, for example.

Figure 6:
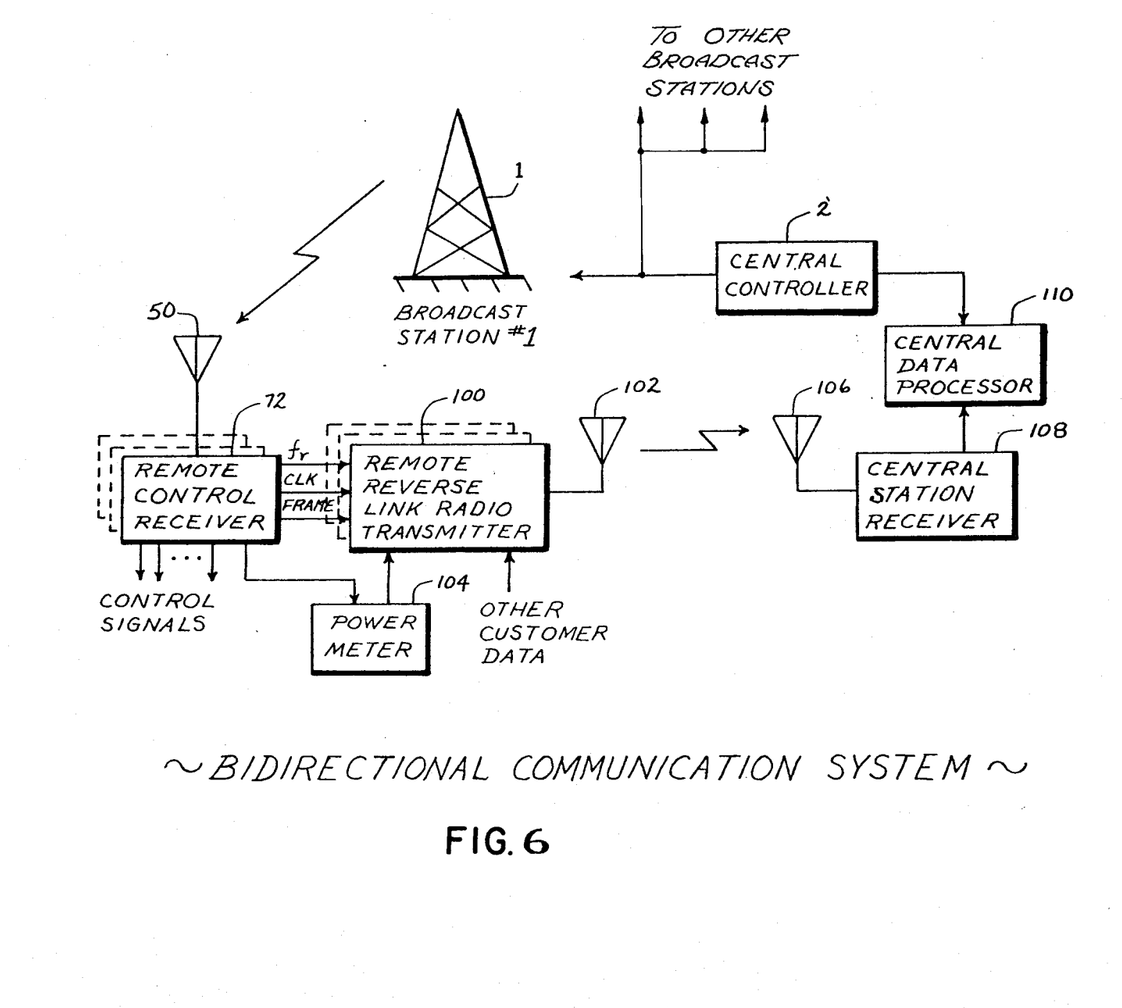

Referring to FIG. 6, remote control receiver 72 comprises the receiver described in connection with FIG. 3, or variations of it. A plurality of such receivers 72 could be located throughout the service area of a power company, for example. Associated with each control receiver 72 is a remote reverse link radio transmitter 100 which is intended to receive meter readings from power meter 104, or other customer data, and relay this information through antenna 102 to antenna 106 to a central station receiver 108. Receiver 108 might be located at a power company's central receiving station.

A new and novel feature of the forward-link is the simultaneous employment of two or more commercial broadcast stations which each radiate identical 80 KHz modulated subcarrier control signals on identical FM radio channels, but in separate geographic areas, which areas may be contiguous. This greatly expands the service area and capitalizes on the fact that the same FM radio channel is frequently assigned to several radio stations which may be as close as 75 miles apart. Control receivers tuned to the same frequency can thus be used in any of these areas to simplify logistic problems and reduce cost. They will not interfere with each other because the "FM capture effect" guarantees only the stronger FM signal will operate the receiver.

Other important improvements in the arrangement of FIG. 6 are disclosed in the parent application entitled "Broadcast System for Distribution Automation and Remote Metering", U.S. patent application Ser. No. 087,543.

Figure 7:
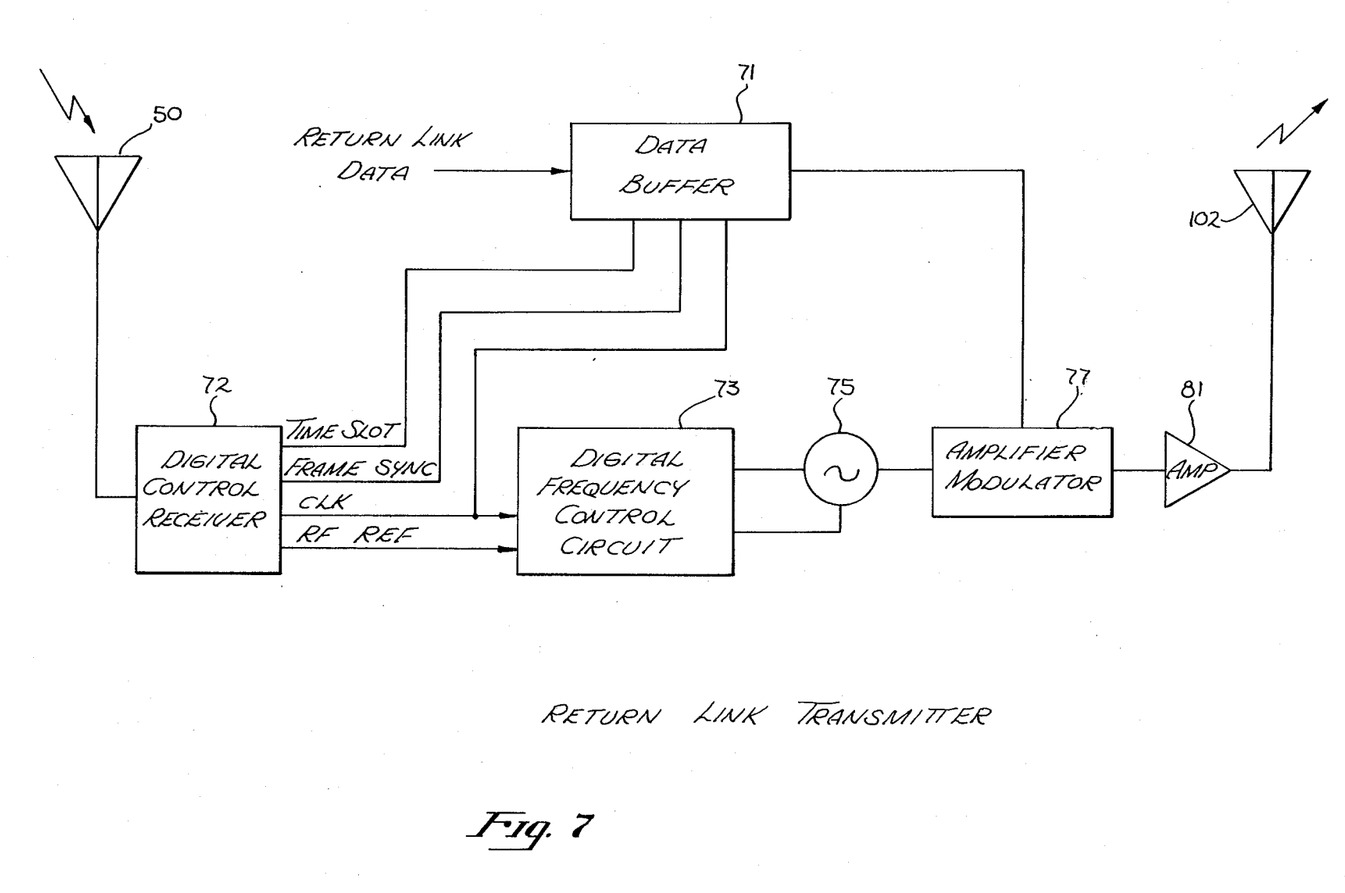
FIG. 7 is a block diagram of a typical return-link transmitter whose carrier frequency and digital bit stream is synchronized by the FM broadcast signal.

FIG. 7 illustrates one arrangement for a return link transmitter which could operate at VHF, for example. Antenna 50 receives the FM broadcast signal and connects it to digital control receiver 72, which receiver has already been described in connection with FIGS. 3 and 4. The central control device (previously described in connection with FIG. 1) controls the time of transmission of all return link transmitters by initiating a polling sequence, which sequence is detected by digital control receiver 72 which thereupon issues a "time slot" in which return transmissions are to take place. Data buffer 71 is provided input digital data from companion devices, such as a power meter, which data is placed in a data buffer and subsequently transmitted during its prescribed time slot in the form of a digital sequence consisting of bits within frames synchronized from the clock and frame sync information provided by receiver 72. Digital frequency control circuit 73 also receives the clock and RF reference from receiver 72 and precisely controls the frequency of master oscillator 75 through digital frequency control circuit 73. A typical circuit 73 is described in U.S. Pat. No. 4,117,405. The reference frequency from oscillator 75 is amplified and modulated in 77 and further amplified in 81 and radiated as a return link signal from antenna 102. Oscillator 75 (for example, a voltage tuned crystal oscillator "VCXO"), operating, for example, at 51.43 MHz and amplifier 77, could be tuned to triple this frequency to the commonly employed load management frequency of 154 MHz. Oscillator 73 is precisely controlled to operate in "subchannel" frequencies, which subchannel frequencies could be selected as closely as 100 Hz apart so that many return link transmitters could be polled to transmit simultaneously on adjacent subchannels and thereby achieve a tightly packed frequency multiplexed operation.

Figure 8:
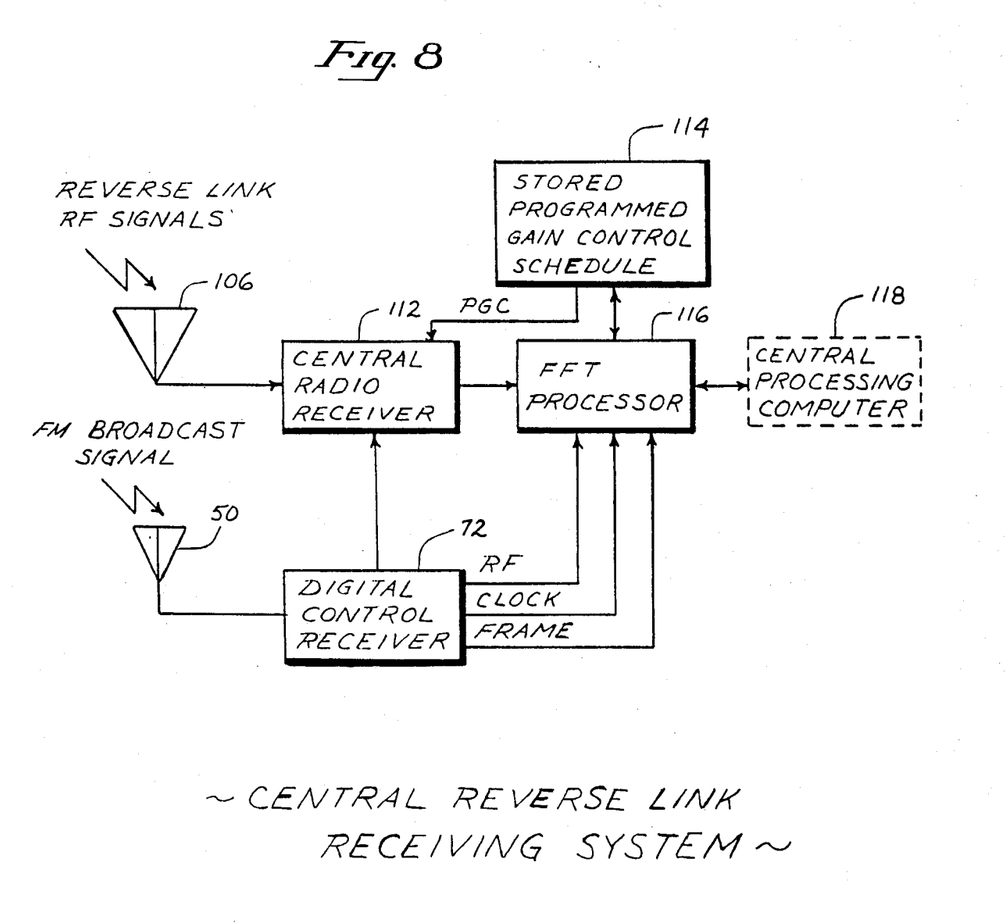
FIG. 8 is a block diagram of central return-link receiver synchronized by the FM broadcast station signals.

FIG. 8 is a simplified block diagram illustrating a significant improvement over the prior art through the use of a fast Fourier transform (FFT) processor central station receiver 108. The improvement lies in synchronization of the FFT time window, sampling rate, and reference radio frequency to the frequency and time synchronizing information available out of the broadcast station. The improvement is significant in that it simplifies the design of the FFT processor and its precision, and have been discussed in detail in the parent patent application, which also describes the function of the other components illustrated in FIG. 8.

Obviously many modifications and variations of the present invention are possible in light of the above teachings. It is therefore to be understood that within the scope of the appended claims the invention may be practiced otherwise than is specifically described.

I claim:

1. A radio communication system for selectively addressing and controlling a plurality of remotely located apparatus comprising in combination:
   (a) central controller means adapted to generate digital address and control messages for transmission to at least one local FM radio broadcast station,
   (b) a local FM radio broadcast station coupled to receive said digital address and control messages from said controller, and including means for generating inaudible modulated subcarrier signals derived from a subcarrier signal of a subcarrier oscillator, the subcarrier signal being modulated by digital address and control signals responsive to said address and control messages and synchronized to said subcarrier oscillator and by occasional special sync signals generated at said local FM radio broadcast station, and for adding its normally broadcasted audio program signal to the modulated subcarrier signal and providing a frequency modulated RF signal in response thereto,
   (c) a plurality of remotely addressable digital radio receivers controlling a plurality of external apparatus and tuned to receive and demodulate the frequency modulated signal of said broadcast station and comprising means to detect and lock onto said subcarrier signal, to detect special sync signals, to decode said address & control signals synchronously with said subcarrier signal and special sync signals, and selectively respond thereto to control said apparatus.

2. The communication system of claim 1 wherein said central controller comprises:
   (a) central receiver adapted to detect and phase-lock to said subcarrier of signal broadcast station to derive therefrom special sync signals and address & control signals,
   (b) digital address and control generator means connected to the output of said central receiver and adapted to receive commands from external apparatus and reformat them into digital address and control messages and "transmit sync" request signals, said "transmit sync" requests being sent at long time intervals, such as hourly,
   (c) a modem coupled to the output of said digital address & control generator to transmit said output to said FM radio station.

3. The central controller of claim 2 wherein said digital address & control generator further compares the address & control signals received from said central receiver to the address & control messages which it generates in order to detect errors and generate corrected output signals for subsequent rebroadcasting.

4. The communication system of claim 1 wherein said FM radio broadcast station modification comprises:
   (a) a subcarrier oscillator providing an inaudible subcarrier frequency,
   (b) a digital encoder means for generating synchronized digitally coded output signals at a first output,
   (c) a phase modulator means connected to said subcarrier oscillator and said digital encoder to phase modulate the subcarrier signal with the digitally coded output signals,
   (d) summing means for adding the phase modulated signal to the normal audio program signal,
   (e) frequency modulation means connected to said summing means for modulating the RF carrier signal prior to transmission as an FM broadcast signal.

5. The broadcast station system of claim 4 wherein said digital encoder receives digital address & control messages from said central controller means through a telephone interface modem.

6. The communication system of claim 1 wherein said FM radio broadcast station modification comprises:
   (a) a first frequency divider means connected to output of a subcarrier oscillator to derive therefrom a digital bit stream clock rate,
   (b) a second frequency divider means driven by said first frequency divider to generate a message frame rate,
   (c) a first input of a sync frame generator means connected to output of said second frequency divider and a second sync frame generator input connected to one output of a digital encoder means to generate therefrom a special sync code output signal upon receipt of a sync enable signal from said encoder,
   (d) said digital encoder means being coupled to receive the output of said first frequency divider at a first input and the output of said sync frame generator at a second input, and said digital address & control signals and sync request signals at a third input, said digital encoder being a means to generate synchronized digitally coded output signals at a first output, and sync enable signals at a second output,
   (e) a phase modulator means connected to said subcarrier oscillator and said digital encoder to phase modulate the subcarrier with the digitally coded output signals,
   (f) summing means for adding the phase modulated signal to the normal audio program signal, and
   (g) frequency modulation means connected to said summing means for modulating the RF carrier signal prior to transmission as an FM broadcast signal.

7. The communication system of claim 1 wherein said remotely located radio receiver comprises:
   (a) receiving means to detect FM broadcast signals from said broadcast station,
   (b) demodulating means connected to output of said receiving means for demodulating said broadcast signals, and
   (c) filter and detection means connected to said demodulating means for separating the subcarrier signal from the audio program signal, and for phase demodulating the subcarrier signal, and to derive reference frequencies including a digital clock signal,
   (d) a digital address detector and control signal decoder means connected to the output of said filter and detection means to synchronously detect and compare address portion of said carries signal to individual or group address stored therein and to decode the control portion of said signal and output control signals to external apparatus,
   whereby said references frequencies may be used to synchronize and control an optional return-link transmitter.

8. The communication system of claim 1 wherein said remotely located radio receiver further comprises arbitrator means connected to the output of said decoder means to provide manual or automatic control.

9. The communication system of claim 1 wherein said radio receivers are connected to the electrical power wiring of buildings to receive therefrom their energizing power and the radio signals from said broadcast station, said building power wiring acting effectively as an antenna, said receivers being adapted to provide control signals on output connecting wires to external apparatus to control their function selectively upon command of said address & control signal.

10. The communication system of claim 1 wherein said receivers are packaged in a form identical to conventional electrical circuit breakers and wherein said receiver derives its power and receives its radio signals through the terminals of said circuit breaker.

11. The control receiver of claim 10 wherein said circuit breaker package includes a conventional circuit breaker adapted to provide power interruption upon receipt of a command from said copackaged receiver.

12. The communication system of claim 1 wherein said radio receiver and external apparatus comprise:
   (a) a multiregister watt-hour meter to measure power consumption on a plurality of sets of indicating dials as engaged by a selector mechanism,
   (b) said radio receiver mounted behind said plural dial sets to selectively engage any one of said plurality dials as commanded by said address & control signal.

13. The communication system of claim 1 wherein said external apparatus comprises a smart thermostat.

14. The communication system of claim 1 wherein external apparatus comprises an audio-visual alert and display to warn of emergency conditions.

15. The communication system of claim 1 having a plurality of local FM radio broadcast stations, each coupled to receive said digital signals from said controller, and including means for generating inaudible subcarrier signals derived from a subcarrier oscillator and modulated by the digital signals and special sync signals, and adding its normally broadcasted audio program signal to the generated subcarrier signals and providing a frequency modulated RF signal in response thereto.

16. The communication system of claim 15 wherein at least two of said plurality of local FM radio broadcast stations broadcast on the same FM radio broadcast channel.

17. The communication system of claim 16 wherein said at least two of said plurality of local FM radio broadcast stations broadcast in separate geographic areas, which areas are contiguous, whereby said radio receivers will lock on to the stronger FM signal as a result of the FM capture effect.

18. A narrowband bidirectional radio communication system comprising:
   (a) a plurality of independent paired radio receiver and transmitter means wherein said receivers are adapted to detect broadcasted subcarrier modulated by address & control signals from an existing standard FM broadcast station in its forward link, and said transmitter means are adapted to accept RF reference and sync signals from its companion receiver and to accept reply message signals from message sources connected at their respective inputs and to transmit said reply message signals synchronously on a corresponding plurality of closely spaced radio carrier frequencies to a central station receiver selectively in response to coded address & control signals transmitted from the local FM radio broadcast station;
   (b) central station receiver means being adapted to receive said radio reply signals simultaneously at said plurality of closely spaced return-link radio carrier frequencies, and to simultaneously detect said RF reference and sync signals from said broadcast station and employ them to synchronously demodulate the radio signals from said plurality of remote transmitter means, (c) central controller means adapted to generate digital address & control signals synchronized to said sync signals broadcasted by said FM radio station, and (d) at least one local FM radio broadcast station adapted to generate and broadcast special sync signals derived from a inaudible subcarrier oscillator and adapted to receive and broadcast digital address & control signals received from said central control means by adding its normally broadcasted audio program signal to the subcarrier signal and then frequency modulating the broadcast RF signal.

19. The communication system of claim 18 wherein said radio receiver comprises a single conversion synchronous design comprising receiving antenna means to detect said broadcast signal connected to RF amplifier means which drives:

(a) the series combination of a bandpass filter coupled to mixer means driving an intermediate frequency (IF) limiter-amplifier means driving a phase detector means driving an amplifier driving a first low pass filter means coupled to a sync detector which drives a frequency divider chain means, and driving second low pass filter means which drives a voltage controlled oscillator means which provides the RF frequency and drives said frequency divider chain means having plural outputs, (b) one output of said divider chain means being connected to a second input of said mixer means and a second output of said divider being connected to a second input of said phase detector means in a phase-lock loop arrangement whereby said oscillator is forced to operate at a frequency precisely equal to the frequency of said broadcast station, or a multiple of it, (c) wherein the output from said first low pass filter comprises the desired data signal and wherein plural outputs from said frequency devider chain comprise the desired bit stream clock and message frame rate signals, (d) external circuit means connected to receive said output signals from said synchronous superheterodyne receiver so as to process said signals and selectively respond thereto to control said external apparatus.

20. The bidirectional communication system of claim 18 wherein said central station receiver comprises;

(a) a first antenna to detect broadcasted signals and drive a digital control receiver phase-locked to the carrier frequency of said broadcast station to derive therefrom a radio reference frequency, sync signals, bit stream and message frame rates, and address & control signals, (b) a conventional central radio receiver RF section including a second antenna to detect signals from said remote transmitters and a radio frequency amplifier having a programmable gain control connected to the output of said second antenna, and a first mixer connected to output of said amplifier, and a local oscillator phase-locked to a multiple of the reference radio frequency from said digital control receiver to thereby generate a stable intermediate frequency (IF) output from said mixer in the frequency range required by the FFT processor, (c) a fast Fourier transform (FFT) processor connected to the IF output of said central radio receiver to compute power spectral density distributions to thereby determine the presence or absence of signals on each of the plurality of frequencies transmitted from the corresponding plurality of remote transmitters, said FFT processor being programmed to operate using time windows, input data sampling rates, and reference radio frequency synchronized from said digital control receiver output signals.

21. The bidirectional communication system of claim 18 wherein said return transmitter means comprises:

(a) a first antenna to detect broadcasted signals and drive a digital control receiver phase-locked to the carrier frequency of said broadcast station to derive therefrom a radio reference frequency, frame sync signals, time slot signals, clocking signals and address and control signals, (b) a digital frequency control circuit coupled to receive said clocking signals and said radio reference frequency from said digital control receiver and providing a control signal in response thereto, (c) an oscillator coupled to receive the control signal from said digital frequency control circuit for providing a reference frequency, (d) a data buffer coupled to receive said time slot signals, frame sync signals and clocking signals, providing a synchronized bit output signal representative of bits within frames synchronized to said clocking and frame sync signals, (e) an amplifier modulator coupled to receive said reference frequency and synchronized bit signals, said modulator amplifying and modulating said signals, (f) an amplifier for amplifying said modulated signals from said amplifier modulator, and (g) a second antenna for transmitting said amplified signals.

22. The narrowband bidirectional radio communication system of claim 18 having a plurality of local FM radio broadcast stations, each adapted to generate and broadcast special sync signals derived from an inaudible subcarrier oscillator and adapted to receive and broadcast digital address and control signals received from said central control means by adding its normally broadcasted audio program signal to the subcarrier signal and then frequency modulating the broadcast RF signal.

23. The communication system of claim 22 wherein at least two of said plurality of local FM radio broadcast stations broadcast on the same FM radio broadcast channel.

24. The communication system of claim 23 wherein said at least two of said plurality of local FM radio broadcast stations broadcast in separate geographic areas, which areas are contiguous, whereby said radio receivers will lock on to the stronger FM signals as a result of the FM capture effect.

* * * * *